Dec. 6, 1949 C. H. KEAN 2,490,273
STRUCTURE FOR MAGNETOSTRICTION TRANSDUCERS
Filed Nov. 18, 1947
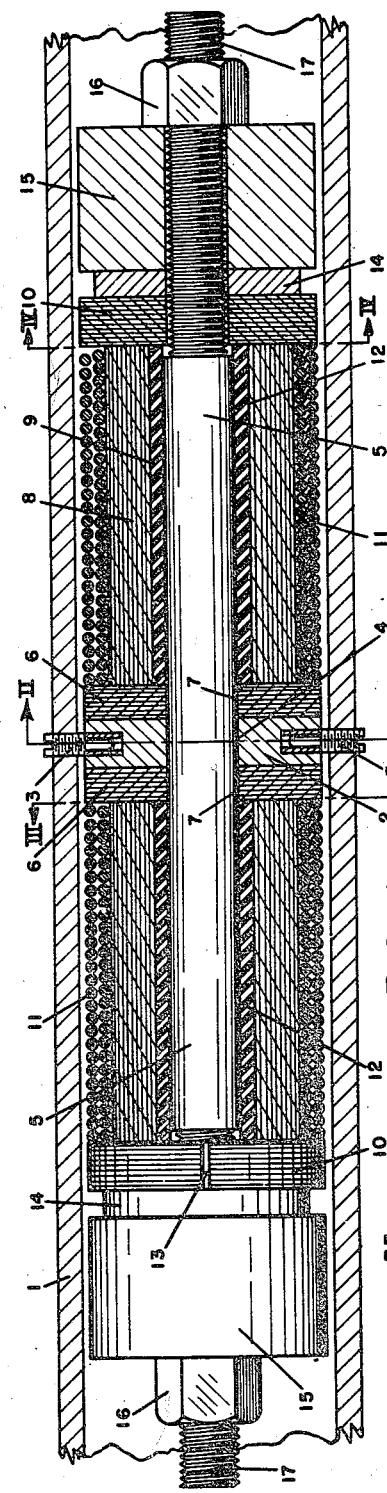
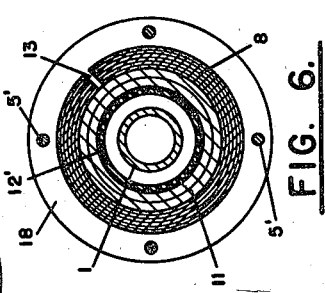
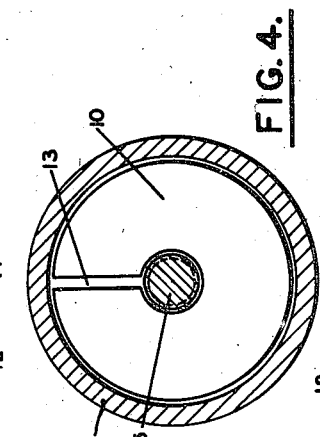
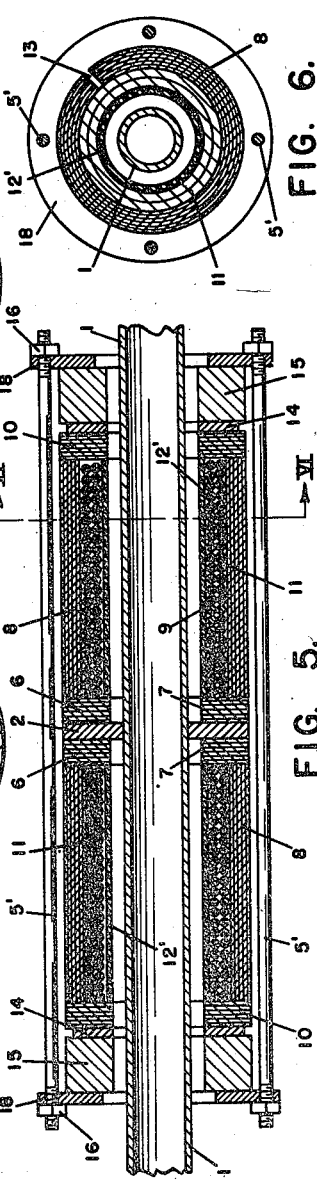
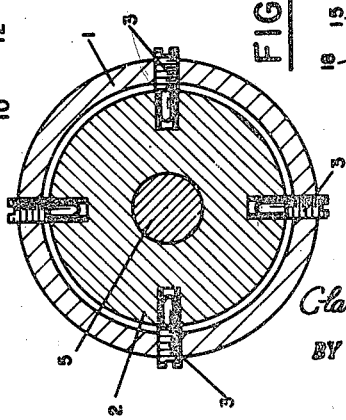
INVENTOR.
Clare H. Kean,
BY
Dwight C. Otis
AGENT.

Patented Dec. 6, 1949

2,490,273

UNITED STATES PATENT OFFICE 2,490,273

STRUCTURE FOR MAGNETOSTRICTION TRANSDUCERS

Clare H. Kean, Houston, Tex., assignor, by mesne assignments, to Standard Oil Development Company, Elizabeth, N. J., a corporation of Delaware Application November 18, 1947, Serial No. 786,753

5 Claims. (Cl. 171—330)

1

The present invention is directed to magnetostrictive devices. More particularly, the invention relates to apparatus for driving an elongated magnetostrictive metal element.

In my copending application Serial No. 597,408, filed June 4, 1945, I have described a method for logging subsurface formations penetrated by a borehole by means of cylindrically symmetric waves. In my copending application Serial No. 763,940, filed July 26, 1947, I have described and claimed particular apparatus employing elongated magnetostrictive elements adapted to use in the practice of the method. The present invention is concerned particularly with a compact coil structure adapted to excite an elongated magnetostrictive bar or tube and cause it to produce acoustic energy, and to couple a portion of the acoustic energy into an electric network which may be associated therewith.

It is known to control the frequency of alternating currents by coupling an oscillatory electrical network to a magnetostrictive bar or tube having a resonant frequency substantially that of the desired frequency. It is also known to generate sound waves by exciting an elongated magnetostrictive metal element and causing it to vibrate at a frequency which is a function of the length of the metal element. In the practice of these prior art methods it is conventional to support the magnetostrictive element at a single point of suspension and to couple the element to an electrical network through one or more solenoids.

I have now discovered an improved solenoid structure which is compact and which makes possible not only the efficient transformation of electrical energy into acoustical energy but also makes possible the efficient transformation of acoustical energy into electrical energy. Briefly stated, my improvement includes a magnetizable metal core member arranged with respect to the solenoid and the magnetostrictive element in such manner that, when minute electric currents flow through the solenoid, the magnetic flux generated thereby is directed predominantly into the magnetostrictive element and causes it to vibrate, and similarly, when the magnetostrictive element is caused to vibrate slightly within the field of the solenoid, the resulting variation in magnetic flux normally associated with the magnetostrictive element causes an alternating current voltage to be developed across the solenoid. My improvement also includes novel means whereby a pair of solenoids may be securely affixed to the magnetostrictive element without

2 interfering with free vibration thereof and magnetic coupling between the solenoids is reduced to a minimum. The improvement of my invention will be better understood from the following description when read in conjunction with the accompanying drawing in which:

Fig. 1 is an elevation view, partly in section, of a preferred embodiment of my invention;

Fig. 2 is a plan view along the section II—II of Fig. 1;

Fig. 3 is a plan view along the section III—III of Fig. 1;

Fig. 4 is a plan view along the section IV—IV of Fig. 1;

Fig. 5 is an elevation view, partly in section, of another embodiment of my invention; and Fig. 6 is a plan view along line VI—VI of Fig. 5.

In the different figures of the drawing, similar numerals designate similar parts of the apparatus of my invention.

Turning first to Figs. 1 and 2, the numeral 1 designates an elongated tube of magnetostrictive metal, such as nickel, chromium or alloys thereof. Although magnetostrictive element 1 is preferably a tube of circular cross-section, in certain applications it may be of rectilinear or polyhedral cross section.

Within element 1, a highly conductive, nonmagnetic metal plate 2 is secured in a plane substantially perpendicular to the longitudinal axis of element 1 by means of a plurality of set screws 3 which are threadedly engaged in the walls of element 1 and penetrate securely into plate 2. Plate 2 is preferably made of copper although other non-magnetic, highly conductive metals, such as brass, bronze, silver and the like may be employed. A central opening 4 is preferably provided in plate 2 to receive a non-magnetic metal rod 5 which is employed to bind together all of the elements of the structure of my invention as will be more fully explained.

Immediately adjacent each of the two plane faces of plate 2 are arranged stacks of thin magnetizable metal sheets which compositely form laminated plate members 6. Laminated plate members 6 define central openings 7 to allow passage of rod 5 therethrough. Plate members 6 are of such diameter that they do not touch the inner walls of tube 1 when mounted in position upon rod 5.

Cylindrical core members 8 made of magnetizable metal are each provided with a longitudinal central opening 9 and are arranged over rod 5 in a manner such that one end of each core member 8 abuts a face of plate member 6 while the other end abuts a face of a plate member 10. Plate members 10 are of identical construction with plates 6. In effect, plate members 6 and 10 and core members 8 form spool-like members upon which are wound solenoids 11 consisting of a plurality of turns of insulated wire whose ends may be brought out to suitable terminals. If desired, core members 8 may be electrically insulated from rod 5 by tubular elements 12 made of insulating material, such as Bakelite, fiber, rubber, or the like. Furthermore, the assembled structure including core members 8, and plates 6 and 10, solenoid 11 and, if desired, plate member 2 and rod 5 may be impregnated with or embedded in a suitable insulating material, such as varnish, rubber, or a natural or synthetic resin, before the structure is mounted within element 1.

Core members 8 and plate members 6 and 10 are each provided with a slot or air gap 13 shown in Figs. 3 and 4. The slot 13 is preferably provided to prevent a short circuit of magnetic flux which is induced in these elements during the operation of the device of my invention.

Each core member 8 may conveniently be constructed by winding a thin sheet of silicon steel upon a mandrel, clamping the winding in place, heat treating the winding so that it will retain its shape, cutting the slot 13 longitudinally along one side of the shaped core, and then removing the mandrel.

Arranged over rod 5 adjacent the outer face of plate 10 may be a washer or spacer 14 made of non-magnetic metal, such as brass or copper. Adjacent washer 14 is arranged a block or cylindrical element 15 made from any permanently magnetizable metal or alloy, such as steel, a magnetizable alloy of aluminum, nickel and cobalt, or the like. If desired, non-magnetic metal spacers 14 may be omitted without adverse effect.

It will be apparent from Fig. 1 that the structure described in the previous paragraphs is symmetrically arranged upon each side of plate 2 and that the elements are held together by nuts or similar means 16 screwed on to each end of rod 5 by means of screw threads 17. It will also be apparent from Figs. 1 to 4 that the structure described in the previous paragraphs is particularly adapted for mounting compactly inside of the magnetostrictive element 1.

In Figs. 5 and 6, I have shown an embodiment of my invention wherein the coil structure may be mounted externally of the magnetostrictive element. In this embodiment, magnetostrictive element 1 may be a hollow tube or a solid rod or bar of the magnetostrictive metal and the highly conductive non-magnetizable metal plate 2 may be affixed to the exterior of element 1 as by silver soldering thereto. As in the embodiment illustrated in Fig. 1, magnetostrictive element 1 may be of rectilinear or polyhedral cross section; however, for purposes of description it will be assumed that element 1 is of circular cross-section and that plate 2 is affixed thereto midway between the ends of the element 1.

Immediately adjacent each of the two plane faces of plate 2 are arranged laminated plate members 6 defining central openings 7. Openings 7 are of slightly greater diameter than the diameter of element 1 so that plate members 6 do not touch against element 1. A laminated core member 8, preferably of circular cross-section, is arranged so that one end thereof abuts against plate member 6 while the other end abuts against plate member 10 which is of identical construction as plate member 6.

As in the embodiment shown in Fig. 1, plate members 6 and 10 and core member 8 are provided with a slot or air gap 13. Core member 8 defines a longitudinal central opening 9 which is of substantially larger diameter than element 1, so that solenoid 11 may be wound upon a tube or form 12' made of insulating material, such as bakelite or fiber, and the resulting assembly may be inserted centrally within core member 8. The inner diameter of insulating form 12' is of greater diameter than magnetostrictive element 1 so that form 12' does not touch against element 1 but leaves the latter free to vibrate. As in the embodiment shown in Fig. 1, a washer or spacer 14 made of non-magnetic metal may be arranged adjacent the outer face of plate member 10 and a permanently magnetizable metal or alloy block 15 is mounted immediately adjacent spacer 14.

As will be seen from Fig. 5, each of the elements mentioned in previous paragraphs are provided in duplicate and are arranged symmetrically adjacent opposite faces of the plate 2. These elements are held securely in place by suitable clamping means such as non-magnetic metal rods 5' passing through two non-magnetic metal clamping plates 18 which are held in place by nuts 16 on rods 5'.

It is imperative that none of the elements except plate 2 should touch element 1 after the structure has been assembled in order that element 1 may be free to vibrate without interference.

In the practice of my invention, plate members 6 and 10 and core member 8 are preferably laminated silicon iron. However, plate members 6 and 10 and core member 8 may be formed from non-laminated metal and may, in some cases, be formed as a single spool-like unit.

Although element 15 may be permanently magnetized before being assembled into either embodiment of the invention as illustrated in Figs. 1 to 6, I prefer to polarize magnetic elements 15 after assembling the structure by wrapping a temporary solenoid around the assembled structure and passing a direct current through the temporary solenoid for sufficient time to magnetize the elements 15 to the desired degree.

It will be apparent to workers skilled in the art that, in the operation of a magnetostrictive device employing the structure of my invention, the ends of the conductors in each of the solenoids 11 will be connected to a suitable electrical network in a manner well known to the prior art. Permanent magnet elements 15 will then provide a small polarized magnetic flux through magnetostrictive element 1 and an alternating electric current flowing in one solenoid will set up a varying magnetic flux which will cause element 1 to vibrate. By arranging solenoid 11 between element 1 and core member 8, the magnetic lines of force within the system are efficiently transferred through member 6, core member 8, plate member 10 and thence through the metal of element 1.

It is to be emphasized that plate member 2 serves not only as a convenient means for mounting element 1 to the solenoid structure, but also serves as a shield between the two solenoids 11. Thus, although each of the solenoids are electromagnetically coupled to element 1, plate member 2 assists in isolating the solenoids so that coupling between them is electromechanical through element 1. One of the solenoids may thus be employed to excite and cause vibration of element 1 while the other solenoid is independently employed to generate an electric potential which is a function of the movement of element 1 within the field of this solenoid.

Having fully described and illustrated my invention, what I wish to claim is:

1. In a magnetostriction transducer including an elongated element of magnetostrictive metal and a pair of excitation coils mounted adjacent thereto, the improvement which comprises two elongated core members arranged in coaxial alignment with each other and with said element and spaced from the later, each of said core members being constructed of laminated magnetizable metal and having end plates at each end thereof adapted to direct magnetic lines of force into said magnetostrictive element, said core members being further characterized by defining a longitudinal slot, a non-magnetic metal plate interposed between said core members, and a solenoid interposed coaxially between said core members and said magnetostrictive element.

2. A device for driving an elongated magnetostrictive member comprising, in combination, a central non-magnetizable metal element with each end of the device symmetrical with respect to the non-magnetizable element and including a first magnetizable metal plate defining a central opening with a narrow slot extending between the central opening and the outside surface thereof, said plate being arranged adjacent said non-magnetizable metal element, an elongated laminated magnetizable metal core member defining a central opening with the laminations extending longitudinally and a longitudinal slot extending between the central opening and the outside surface thereof, a solenoid mounted against said core member and arranged adjacent a surface of the magnetostrictive element, a second magnetizable metal plate defining a central opening and having a slot extending between the central opening and the outside surface, said second plate being adjacent one end of the coil and core member and the first plate adjacent the other end of the core and coil member, a permanently magnetizable metal body mounted adjacent the second magnetic plate, and a non-magnetizable mounting member arranged to maintain said plates, core members, and bodies in fixed relationship to said non-magnetizable metal element and spaced from said magnetostrictive member.

3. In a magnetostriction transducer including an elongated magnetostrictive element and a pair of excitation coils mounted adjacent a medial portion thereof and adapted to be driven by electronic excitation means, the improved coil assembly which comprises a pair of magnetizable metal spool-like members, each defining a coaxial opening therethrough and having a narrow longitudinal slot arranged along the periphery thereof, a coil of insulated wire wound on each of said spool-like members, a non-magnetizable metal plate defining a concentric opening therein arranged coaxially between abutting ends of said spool-like members, a permanently magnetized metal member arranged coaxially adjacent the non-abutting ends of each of said spool-like members, means for rigidly clamping together said spool-like members, said metal plate and said magnetized metal members to form a coil assembly, and means for rigidly mounting said magnetostrictive element to said non-magnetic metal plate.

4. The improved coil assembly in accordance with claim 3 rigidly mounted coaxially within and spaced from said magnetostrictive element.

5. The improved coil assembly in accordance with claim 3 rigidly mounted coaxially around and spaced from said magnetostrictive element.

CLARE H. KEAN.

REFERENCES CITED

The following references are of record in the file of this patent:

UNITED STATES PATENTS

| Number | Name | Date |
| --- | --- | --- |
| 2,076,330 | Wood et al. | Apr. 6, 1937 |
| 2,249,835 | Lakatos | July 22, 1941 |